(12) United States Patent
Testa et al.

(10) Patent No.: US 10,253,518 B2
(45) Date of Patent: Apr. 9, 2019

(54) SUPPORT STRUCTURE FOR A FENCE

(71) Applicant: BETAFENCE HOLDING, Ghent (BE)

(72) Inventors: Mauro Testa, Tortoreto (IT); Andrea Bori, Tortoreto (IT); Antonio Laudadio, Tortoreto (IT); Alfredina Gloria, Tortoreto (IT)

(73) Assignee: BETAFENCE HOLDING, Ghent (BE)

( * ) Notice: Subject to any disclaimer, the term of this patent is extended or adjusted under 35 U.S.C. 154(b) by 0 days.

(21) Appl. No.: 15/123,808

(22) PCT Filed: Mar. 6, 2015

(86) PCT No.: PCT/IB2015/051642
§ 371 (c)(1),
(2) Date: Sep. 6, 2016

(87) PCT Pub. No.: WO2015/132762
PCT Pub. Date: Sep. 11, 2015

(65) Prior Publication Data
US 2017/0016243 A1    Jan. 19, 2017

(30) Foreign Application Priority Data
Mar. 6, 2014 (IT) .............................. MI2014A0353

(51) Int. Cl.
*E04H 12/22* (2006.01)
*E04H 17/22* (2006.01)
(Continued)

(52) U.S. Cl.
CPC ....... *E04H 12/2292* (2013.01); *A63B 71/022* (2013.01); *A63B 71/023* (2013.01);
(Continued)

(58) Field of Classification Search
USPC ....... 248/519, 521, 523, 528, 419, 317, 150, 248/149; 40/607.1
See application file for complete search history.

(56) References Cited

U.S. PATENT DOCUMENTS 3,235,214 A * 2/1966 Sprung ................. E01F 13/085
248/158
4,137,662 A * 2/1979 Baumer ................. E01F 9/627
40/608

(Continued)

FOREIGN PATENT DOCUMENTS

| CN | 103721369 A | * | 4/2014 | ............... A63B 5/02 |
|---|---|---|---|---|
| FR | 1482473 A | | 5/1967 | |
| GB | 2489228 A | | 9/2012 | |

OTHER PUBLICATIONS

International Search Report for PCT/IB2015/051642 dated Jul. 6, 2015.

*Primary Examiner* — Alfred J Wujciak
(74) *Attorney, Agent, or Firm* — Pearne & Gordon LLP

(57) ABSTRACT

A supporting structure for fences is disclosed consisting of a base consisting of a bottom plate from which a box body open on one side and partly on the top surface projects which houses and supports a post, characterized in that in said structure horizontal and rotational displacement means of said post are provided with respect to said base, as well as adjustment means of the horizontal and rotational sliding motion of said post with respect to said base.

9 Claims, 3 Drawing Sheets

(51) Int. Cl.
  *E01F 13/02* (2006.01)
  *E01F 9/638* (2016.01)
  *A63B 71/02* (2006.01)
  *F16M 11/10* (2006.01)
  *F16M 11/16* (2006.01)

(52) U.S. Cl.
  CPC .............. *E01F 9/638* (2016.02); *E01F 13/02* (2013.01); *E04H 12/2253* (2013.01); *E04H 12/2261* (2013.01); *E04H 12/2269* (2013.01); *E04H 12/2284* (2013.01); *E04H 17/22* (2013.01); *F16M 11/10* (2013.01); *F16M 11/16* (2013.01)

(56) References Cited

U.S. PATENT DOCUMENTS

D257,238 S * 10/1980 Landsman ................ D10/109.1
7,243,450 B2 * 7/2007 Dicke ................ G09F 15/0056
                                                        248/167
2005/0173690 A1   8/2005 Penning \* cited by examiner

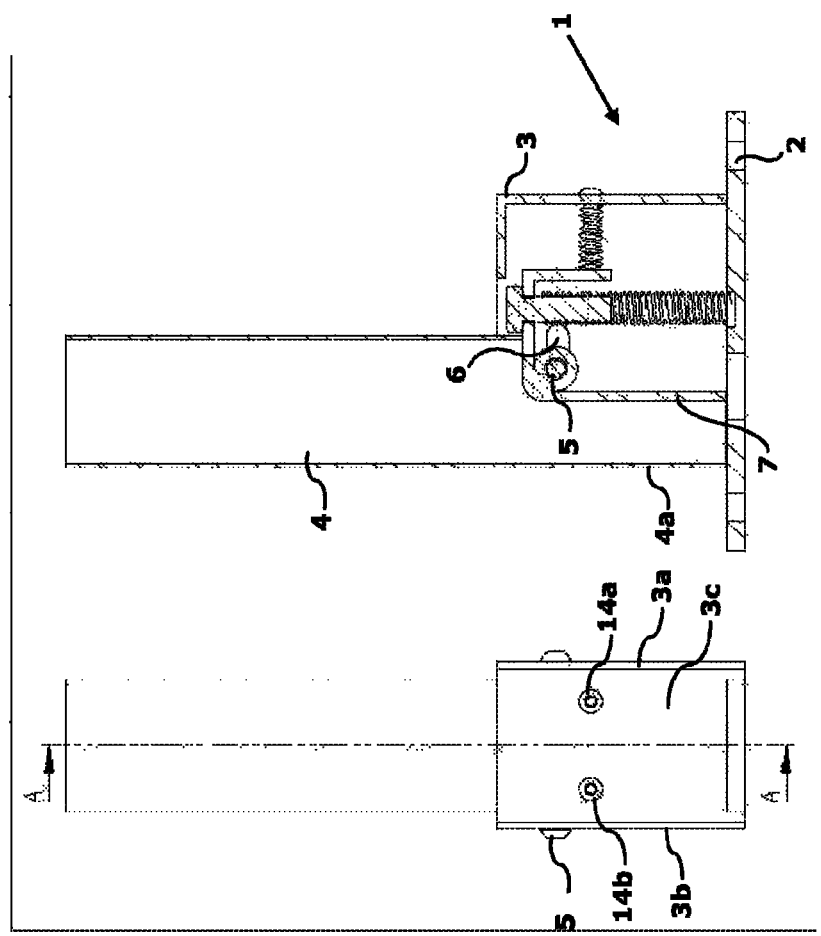

SUPPORT STRUCTURE FOR A FENCE

This is a National Stage application of PCT international application PCT/IB2015/051642, filed on Mar. 6, 2015 which claims the priority of Italian Patent Application No. MI2014A000353 entitled "SUPPORT STRUCTURE FOR A FENCE", filed Mar. 6, 2014, both of which are incorporated herein by reference in their entirety.

FIELD OF THE INVENTION

The present invention generically relates to the sector of fencing posts, and in particular to fencing posts for sports facilities.

BACKGROUND ART

In most cases sports facilities are surrounded by a fence aimed at limiting the sport activity area and avoiding the intrusion of unauthorised users. Typically, the fence consists of a series of posts arranged at regular distances apt to support a protection mesh.

The rigidity of the posts conventionally used in the building industry in certain cases has been a cause of traumas due—during operation—to an athlete's direct and involuntary impact against one of the posts. Understandably, this kind of problem has occurred, and has remarkable importance, especially in those plants where children are present, both due to their greater fragility, and to the lesser motor ability in agonistic activity.

In order to improve safety, and reduce accidents, posts provided with resilient properties have been manufactured, that is, posts provided with means apt to guarantee a controlled deformation limited in the vertical plane with a defined degree of rigidity, and to allow the independent return thereof into the original position.

In the past various devices have been used. For example, FR1482473 discloses a tripartite post, wherein the intermediate element is made of rubber, to guarantee the oscillation of the element connected thereto above.

However, this kind of post—due to the very nature of the material it is made of—cannot guarantee any certainty on the oscillation direction, with the consequent risk that the effect of a similar solution is counterproductive. As a matter of fact, since no protection system from (desired or undesired) outside stresses can be expected, the risk that athletes are victims of an unexpected and undesired oscillation of one or more fence posts leads to look for alternative solutions.

In particular, for the post to be able to guarantee the required safety, it is necessary that the oscillation be exclusively one-directional, and specifically from the inside to the outside of the activity area. The need is therefore felt to accomplish a fencing post which is able to undergo a temporary deformation seconding the impact force according to a single direction.

Moreover, it has been detected that the prior-art posts apt to reduce the impact effect have the further disadvantage of having a limited effect in the impact absorption.

It is thus felt the further need to find solutions which may reduce the impact effect, increasing instead the motion amount absorbed by the impact.

The object of the present invention is therefore to accomplish a fencing post which is capable of seconding along a single motion direction the impact due to a moving body, contextually reducing the traumatic effect due to the impact, without any deformation from outside the fencing being possible.

Said object is achieved through a fencing support structure consisting of a base made up of a bottom plate from which a box body projects open on one side which houses and supports a fencing post, characterised in that in said structure horizontal and rotational displacement means of said post with respect to said base are provided as well as adjustment means of the horizontal sliding motion and rotation means of said post with respect to said base.

In particular, said horizontal displacement and rotation means consist of hinging means passing through horizontal eyelets provided on the lateral parallel walls of the box body and kept in engagement with said pest. Equally, the adjustment means of the horizontal and rotation motion consist of horizontal and vertical spring means, kept in steady engagement with said base and said post, respectively.

Other features and advantages of the solution just briefly described will be clearer from the following description of the invention with reference to a preferred embodiment, given purely as a non-limiting example and illustrated in the attached drawings, wherein:

FIG. 3 is the front view of the structure of FIG. 1, and

FIG. 4 is the section view along the lines A-A of the structure of FIG. 2.

DETAILED DESCRIPTION OF THE PREFERRED EMBODIMENT

Figure 1:
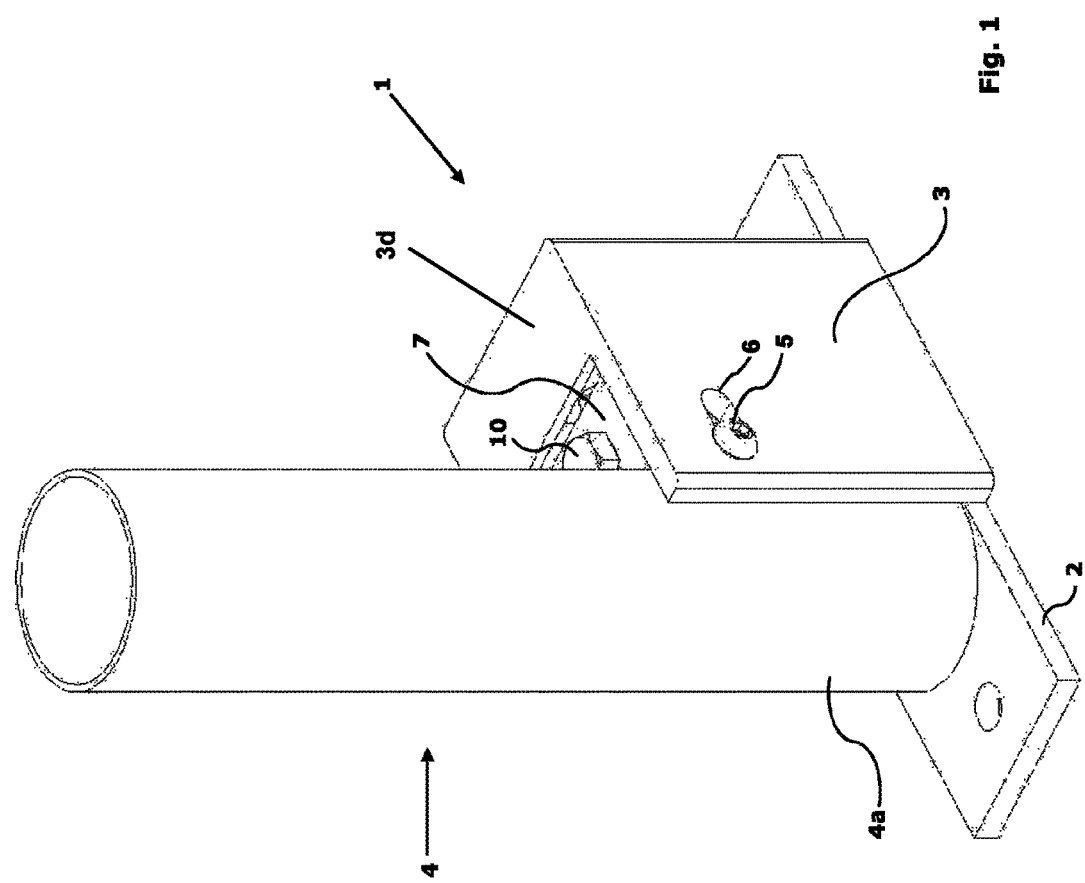
FIG. 1 represents a perspective view from above of the structure according to the invention.
Figure 2:
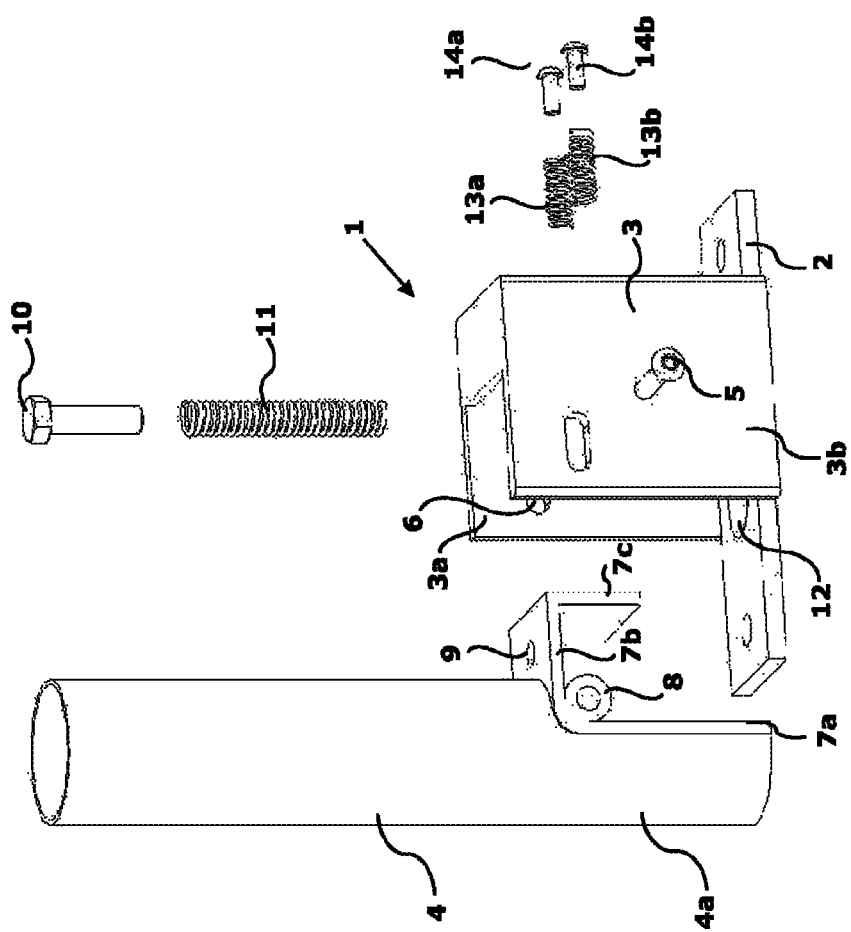
FIG. 2 is the exploded view of the structure of FIG. 1.

The support structure of a fence consists of a base 1 consisting of a base plate 2 from which a box body 3 open on one side and partly on the top surface projects, which houses within the tapered base 4a of a post 4 projecting upwards, kept in engagement with said box body 3 by a through-screw 5 for hinging post 4 to base 1. For such purpose, screw 5 enters horizontal eyelets 6 obtained on the walls of the two opposite sides (3a, 3b) of said box body.

In the illustrated embodiment, post 4 has a substantially circular shape, with the exclusion of base 4a, which has a semicircular shape, on the planar walls, that is, the vertical one of the semicircular portion 4a, and the one perpendicular thereto from which the circular portion originates, a J-shaped bracket 7 being welded.

In correspondence of the angle between the greatest-length surface 7a and the surface 7b adjacent thereto, and parallel to the ground, it is furthermore welded a bush 8 apt to house said through-screw 5. Finally, centrally to the surface 7b parallel to the ground a through-hole 9 is provided 9 for the housing of a sealing screw 10 apt to keep in steady engagement an opposition spring 11 between said bracket 7 and the base plate 2 of said base 1.

Preferably, said base plate is provided with a circular cavity 12 apt to the housing of said spring 11.

Finally, between the surface 7c of bracket 7 parallel to said surface 7a and the bottom wall 3c of box body 3 a pair of opposition springs 13a, 13b is provided, kept in position by screws 14a, 14b fastened on said front wall 3c of said box body 3.

Such structure allows a controlled and one-directional, rotary and translational movement—possibly combined. As a matter of fact, the lateral walls 3a, 3b of box body 3 define the rotation direction of post 4, while the relationship between through-screw 5 and eyelets 6 guides the horizontal displacement thereof. Moreover, the maximum angle of rotation of post 4 with respect to the hinging axis passing through screw 5 is defined by the distance between post 4 and the top wall 3*d* of box body 3.

At the same time, the presence of the spring system 11 and 12 allows the dampening of the amount of motion upon a possible impact, and the controlled return of the post to the original position. As a matter of fact, the correct adjustment of the spring charge allows a dampening of the force applied to the post, and of the reaction force.

From the foregoing description it can therefore be evinced that a fencing support system has been obtained provided with a base carrying hinging means for post bending and opposition and return means of the post displacement. Therefore, rigidly fastening the base to an outside support, such as for example a plinth or curb made of reinforced concrete, one nevertheless has the guarantee of the bending with respect to a vertical axis in a defined direction whenever an outside force is applied to return in the initial position. With respect to other existing solutions, the assurance of controlled return by a dampening system apt to avoid the return recoil was desired.

A fencing system has hence been obtained with the peculiarity of having the features of being made with a shockproof post capable of oscillating in case of impact by a person, accomplishing a controlled oscillation in preset directions and with a defined maximum degree of inclination and which subsequently returns in the initial vertical position.

By this new shockproof system greater safety is imparted to the post and to the entire fencing system, towards the users of the activity area where the product is present. A remarkable reduction of injuries for the athletes is therefore obtained, and as a result a greater protection of people's health.

However, it is understood that the invention is in no way limited to the particular arrangement illustrated above, which makes up only an exemplifying embodiment thereof, but that a number of variants are possible, all within the reach of a person skilled in the field, without departing from the scope of protection of the invention, as defined by the following claims. In particular, the description is based on a circular-base post: evidently nothing prevents the post from having a different profile, such as square, tapered, or whatever other shape may be of project interest.

It is furthermore possible to provide similar solutions to the one just described for the regulated displacement system of the post, managed in particular by springs, using for example a resilient disc system. As a further alternative, a system of suitably polarised magnets may be used in this case, the difference of potential which is generated could be used for generating electric energy.

The invention claimed is:

1. Supporting structure for fences, said supporting structure consisting of a base (1) consisting of a base plate (2), a box body (3) projecting upwardly from the base plate (2), said box body (3) open on one side and partly on the top surface, and a post (4) housed in the open side of the box body and supported by the box body (3), wherein said supporting structure comprises:

a horizontal and rotational displacement means for moving said post (4) of the structure with respect to said box body (3), said horizontal and rotational displacement means consisting of a through-screw (5) kept in engagement with said post (4) and housed in slits (6) formed in opposite walls (3*a*, 3*b*) of said box body (3); and adjustment means for horizontal and rotational sliding motion of said post (4) with respect to said box body (3), wherein said post (4) has a tapered base (4*a*), a J-shaped bracket (7) welded at a location corresponding to a thickening point of a profile of the tapered base (4*a*) and a bush (8) attached to said J-shaped bracket (7) for receiving said through-screw (5).

2. The structure as claimed in claim 1) wherein said adjustment means for horizontal and rotational sliding motion of said post (4) with respect to said box body (3) consists of opposition spring means (11, 13*a*, 13*b*) kept in engagement with said bracket (7).

3. The structure as claimed in claim 2) wherein said opposition spring means (11) are vertically-arranged spring means, kept in engagement between said base plate (2) and a top surface (7*b*) parallel to the ground of said bracket (7), at a location corresponding to a hole (9) housing a fastening screw (10).

4. The structure as claimed in claim 3) wherein on said base plate (2) a cavity (12) housing said opposition spring (11) is furthermore provided.

5. The structure as claimed in 2) wherein said opposition spring means (13*a*, 13*b*) are horizontally-arranged, kept in engagement between a front wall (3*c*) of the said box body (3) and a surface (7*c*) of said bracket (7) parallel and proximal thereto by screws (14*a*, 14*b*) fastened on said front wall (3*c*).

6. The structure as claimed in claim 1), wherein said post (4) has a circular profile.

7. The structure as claimed in claim 1) wherein said post (4) has a polygonal profile.

8. The structure as claimed in claim 1) wherein said adjustment means for horizontal and rotational sliding motion of said post (4) with respect to said box body (3) consists of a resilient-disc system.

9. The structure as claimed in claim 1) wherein said adjustment means for horizontal and rotational sliding motion of said post (4) with respect to said box body (3) consists of a magnet system.

\* \* \* \* \*